United States Patent [19]

Fujiwara

[11] Patent Number: 5,024,726

[45] Date of Patent: Jun. 18, 1991

[54] METHOD FOR PRODUCING A $\lambda/4$ SHIFT TYPE DIFFRACTION GRATING

[75] Inventor: Masatoshi Fujiwara, Itami, Japan

[73] Assignee: Mitsubishi Denki Kabushiki Kaisha, Japan

[21] Appl. No.: 447,850

[22] Filed: Dec. 8, 1989

[30] Foreign Application Priority Data

Feb. 27, 1989 [JP] Japan ................................. 1-46254

[51] Int. Cl.$^5$ ........................................... H01L 21/308
[52] U.S. Cl. .................................. 156/653; 156/652; 156/655; 156/657; 156/661.1; 427/162; 427/43.1; 350/320; 350/162.17; 350/162.23
[58] Field of Search .............. 156/643, 652, 653, 655, 156/657; 350/162.17, 162.18, 162.19, 162.20, 162.23, 320; 427/162, 43.1, 53.1; 437/942

[56] References Cited

U.S. PATENT DOCUMENTS

| | | | |
|---|---|---|---|
| 4,774,164 | 9/1988 | Peavey et al. | 156/643 |
| 4,782,035 | 11/1988 | Fujiwara | 437/129 |
| 4,792,197 | 12/1988 | Inoue et al. | 350/162.2 |
| 4,806,442 | 2/1989 | Shirasaki et al. | 350/162.17 |
| 4,806,454 | 2/1989 | Yoshida et al. | 350/162.11 |
| 4,842,633 | 6/1989 | Kuribayashi et al. | 156/638 |

FOREIGN PATENT DOCUMENTS 58-154285  9/1983  Japan ................................. 156/656

*Primary Examiner*—Kenneth M. Schor
*Assistant Examiner*—Todd J. Burns
*Attorney, Agent, or Firm*—Leydig, Voit & Mayer

[57] ABSTRACT

A method for producing a $\lambda/4$ shift type diffraction grating by producing a diffraction grating pattern on a substrate with a material capable of being selectively etched relative to the substrate, depositing a resist to bury the diffraction grating pattern, removing a portion of the resist to expose at least a portion of the surface of the diffraction grating pattern, removing the diffraction grating pattern on a first portion of the substrate, etching the first portion of the substrate using the remaining resist pattern as a mask, and etching a second portion of the substrate adjacent to the first portion using the remaining diffraction grating pattern on the second portion of the substrate, thereby producing a $\lambda/4$ shift type diffraction grating having a $\lambda/4$ phase shift region at the junction of the first and second portions of the substrate.

5 Claims, 3 Drawing Sheets

FIG. 1(f)
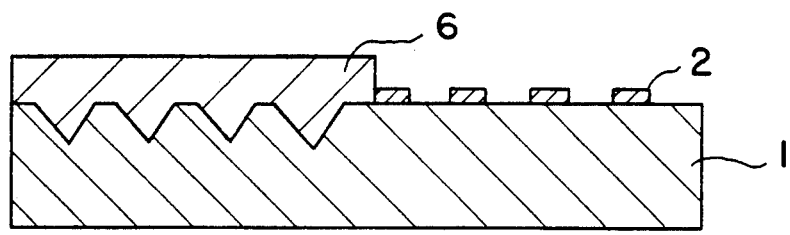
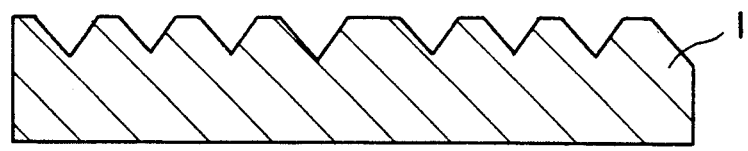
FIG. 1(g)

METHOD FOR PRODUCING A λ/4 SHIFT TYPE DIFFRACTION GRATING

FIELD OF THE INVENTION

The present invention relates to a method for producing a λ/4 shift diffraction grating.

BACKGROUND OF THE INVENTION

It is quite important for a semiconductor laser to oscillate at a single wavelength in its practical use. Therefore, a variety of devices have been suggested to cause oscillation of a semiconductor laser at a single wavelength. Among those, there is a DFB (distributed feedback) laser in which diffraction grating has a constant period in the resonator length direction at the neighborhood of the active layer inside the cavity. In this DFB laser, as a result of the diffraction grating, only light having a wavelength which satisfies the Bragg reflection condition resonates within the waveguide structure, thereby producing a single wavelength oscillation. In the DFB laser having such a constant period diffraction grating, however, there is actually no oscillation at the single Bragg wavelength, oscillation occurs at two wavelengths shifted toward the longer wavelength side and shorter wavelength side from the Bragg wavelength, respectively. In order to force the DFB laser to oscillate at a single wavelength, it is required to provide a λ/4 shift region for shifting the phase of the light guided in the reverse direction at the central portion of the diffraction grating.

FIGS. 2(a) to 2(f) show cross-sectional views of a prior art method for producing a λ/4 shift type diffraction grating. In the Figures, reference numeral 1 designates a semiconductor substrate, reference numeral 2 designates an insulating film, and reference numerals 3, 4, 5, and 6 designate a first resist, a second resist, a third resist, and a fourth resist, respectively.

The production process will be described.

First of all, a first resist 3 is deposited on a semiconductor substrate 1, and as shown in FIG. 2(a), a diffraction grating pattern is produced utilizing an interference exposure method, i.e., by exposure to a pattern of interferance fringes.

Next, as shown in FIG. 2(b), an insulating film 2 comprising such as $SiN_x$ is deposited on the substrate 1 and the diffraction grating pattern of the first resist 3 by a low temperature growth method such as electron cyclotron resonance (ECR) plasma chemical vapor deposition (CVD).

Next, as shown in FIG. 2(c), almost half of the length in the resonator length direction of the substrate 1 is covered by a third resist 5, and the insulating film 2 which is not covered by the third resist 5 is removed by wet etching using a fluorine-containing etchant of or plasma etching using $CF_4$. Thereafter, the substrate 1 is etched using the pattern comprising the first resist 3.

Next, as shown in FIG. 2(d), the third resist 5 is removed, and the insulating film 2 above the first resist 3 is removed by selectively etching it, thereby exposing the first resist 3 and leaving the insulating film 2 between the diffraction grating pattern of the resist 3. Herein, the characteristic that the etching rate of the insulating film 2 on the resist 3 is higher than that of the insulating film 2 on the substrate 1 is utilized.

Next, as shown in FIG. 2(e), the exposed diffraction grating of the first resist 3 is removed, and a fourth resist 6 is deposited on the portion of the diffraction grating of the substrate which is produced by etching in the process of FIG. 2(c), and the other portion of the substrate is etched utilizing the pattern of the insulating film 2.

Thereafter, the insulating film 2 and the fourth resist 6 are removed, thereby to complete a diffraction grating provided with a λ/4 shift region at the central portion thereof as shown in FIG. 2(f).

The prior art λ/4 shift type diffraction grating is produced as described above, and in the process of FIG. 2(b), an insulating film 2 is deposited in a low temperature process in order to prevent the deterioration of the first resist 3. Although the low temperature deposition is used, the deterioration of the first resist 3 at the production of the insulating film 2 cannot be sufficiently prevented, whereby the resist hardens and cannot be easily removed later. Therefore, a load is applied to the substrate in the resist removing process, and the quality of the produced diffraction grating is deteriorated.

SUMMARY OF THE INVENTION

The present invention is directed to solving the above-described problems and has for its object to provide a production method for a λ/4 shift type diffraction grating which has no process by which the resist is deteriorated.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a production method of a λ/4 shift type diffraction grating of the present invention, a diffraction grating is produced on a substrate using a material capable of being selectively etched relative to the substrate, resist is deposited on the substrate on which the diffraction grating is produced, a portion of the resist is removed to expose a portion of the surface of the material producing the diffraction grating, the diffraction grating on a portion of the substrate is removed, the substrate is etched with using the pattern of the remaining resist which is directly in contact with the portion of the substrate, and the other portion of the substrate is etched using the pattern of material producing the diffraction grating. Accordingly, there is no process of producing an insulating film on the resist, and deterioration of the resist can be avoided, thereby producing a good quality λ/4 shift type diffraction grating.

BRIEF DESCRIPTION OF THE DRAWINGS

FIGS. 1(a) to 1(g) are diagrams showing processes in a method for producing a λ/4 shift type diffraction grating according to an embodiment of the present invention.

DETAILED DESCRIPTION OF THE PREFERRED EMBODIMENTS

Figure 1A:
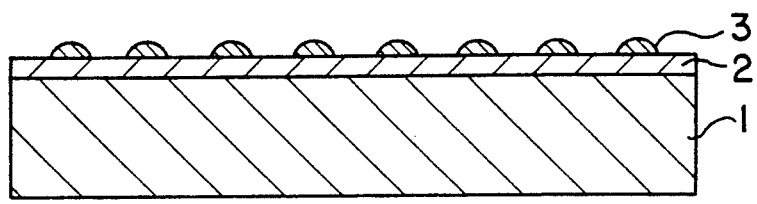

An embodiment of the present invention will be described in detail with reference to the drawings.

FIGS. 1(a) to 1(e) show a method for producing a λ/4 shift type diffraction grating according to an embodiment of the present invention. In FIG. 1, the same reference numerals designate the same elements as those shown in FIG. 2.

First of all, as shown in FIG. 1(a), an insulating film 2 comprising such as $SiN_x$ is deposited on a semiconductor substrate 1 by the ECR plasma CVD method, and a first resist 3 is deposited on the insulating film 2. Thereafter, a diffraction grating pattern of the first resist 3 is produced by the interference exposure method.

Figure 1B:
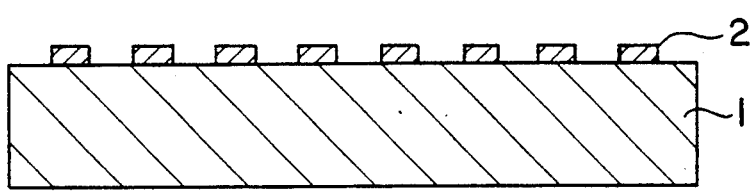

Next, as shown in FIG. 1(b), the insulating film 2 is etched using the diffraction grating pattern of the first resist 3, as a mask. Thereafer the resist 3 is removed, thereby to produce a diffraction grating pattern of insulating film 2.

Figure 1C:
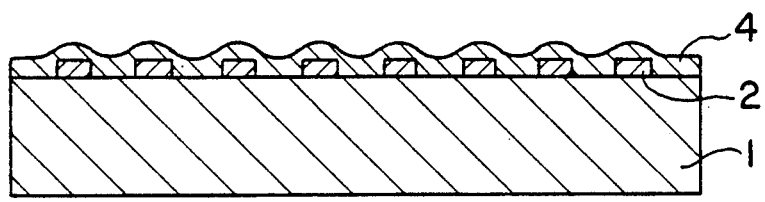
Figure 1D:
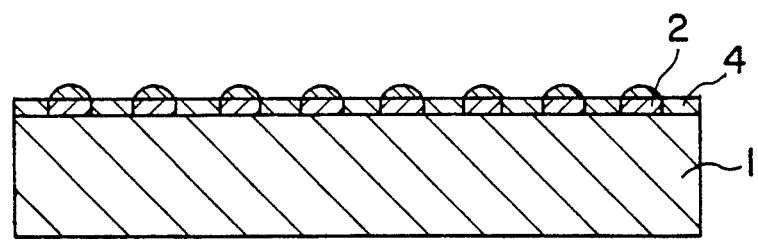

Next, as shown in FIG. 1(c), a second resist 4 is deposited on the substrate and on the diffraction grating pattern of the insulating film 2. Then, as shown in FIG. 1(d), the second resist 4 is lightly etched to expose at least a portion of the surface of the diffraction grating pattern in insulating film 2.

Figure 1E:
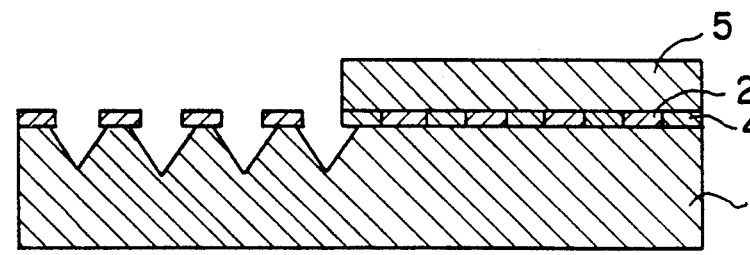
Figure 2A:
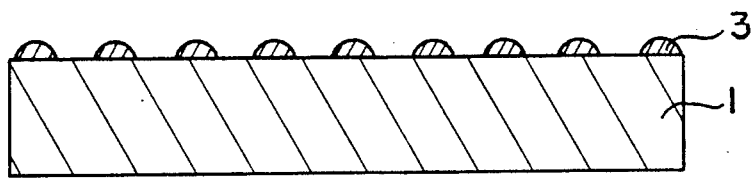
FIGS. 2(a) to 2(f) are diagrams showing processes in a prior art method for producing a λ/4 shift type diffraction grating.
Figure 2B:
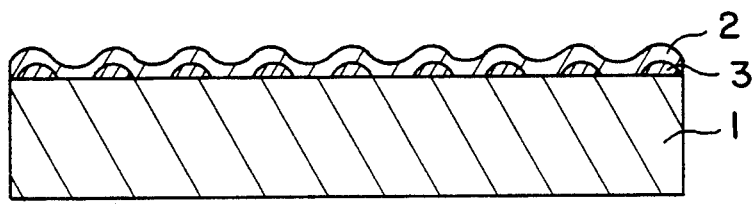
Figure 2C:
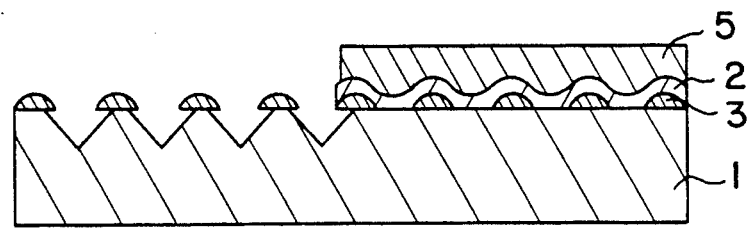
Figure 2D:
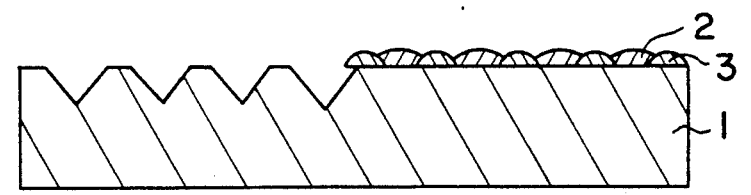
Figure 2E:
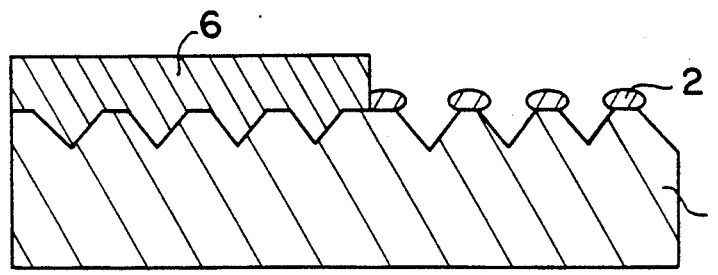
Figure 2F:
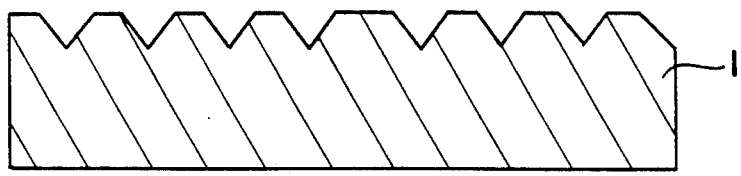

Next, as shown in FIG. 1(e), about half of the resonator length of the substrate is covered by a third resist 5, and the insulating film 2 which is not covered by the third resist 5 is removed by wet etching using an etchant containing fluorine such as hydrofluoric acid or plasma etching using $CF_4$, and the resist 4 remaining on the insulating film 2 is lifted-off at the same time. Thereafter, the substrate 1 is etched using the remaining second resist 4 as a mask. Thereafter, all the resists are removed, and the portion of the diffraction grating in the substrate which is produced by etching in the process of FIG. 1(e) is covered by a fourth resist 6 as shown in FIG. 1(f). The other portion of the substrate is etched using the pattern of the insulating film 2 as a mask.

Thereafter, the fourth resist 6 and the insulating film 2 are removed, thereby completing a $\lambda/4$ shift type diffraction grating having a $\lambda/4$ phase shift region at approximately the central portion of the substrate 1 as shown in FIG. 1(g).

In the above described embodiment, a diffraction grating is produced using an insulating film 2 comprising, for example, $SiN_x$ on the substrate 1, a first resist 3 is deposited on the substrate on which a diffraction grating is to be produced, the resist 3 is partially removed from the surface to expose at least a portion of the surface with a diffraction grating pattern in the insulating film 2, remaining the diffraction grating on about a half the length of the resonator on the substrate 1 is removed, the substrate is etched with using a pattern of the remaining resist 4 which is in direct contact with substrate, and the other portion of the substrate is etched using the diffraction grating pattern of the insulating film 2, as a mask thereby to produce a diffraction grating. Accordingly, there is no process of depositing an insulating film on a resist, and the deterioration of the resist is avoided, thereby obtaining a good quality $\lambda/4$ shift type diffraction grating. Thus, there is no bad influence during later crystal growth and element production, thereby resulting in a high quality single wavelength oscillation laser having reduced element deterioration.

While in the above illustrated embodiment light etching is conducted to leave the photoresist 4 on the insulating film 2 in the process of FIG. 1(d), the resist 4 on the insulating film 2 may be entirely removed leaving the resist 4 between the diffraction grating pattern elements of the insulating film 2.

With respect to the substrate on which the $\lambda/4$ shift type diffraction grating is produced in the above-illustrated embodiment, the substrate is considered as the above-described substrate in a case diffraction grating is directly produced on a substrate for a semiconductor laser. In a case where a light guide layer is produced on a semiconductor laser substrate and a diffraction grating is produced on the light guide layer, the semiconductor laser substrate and the light guide layer constitute the above-described substrate. In a case where a diffraction grating is produced on a layer which is produced on an active layer of a semiconductor laser, the semiconductor laser substrate and the semiconductor layers up to the layer on which the diffraction grating is produced constitute the above-described substrate.

As is evident from the forgoing description, according to the present invention, a diffraction grating is produced on a substrate by a material capable of being selectively etched relative to the substrate, a resist is deposited on the substrate on which the diffraction grating is produced, a portion of the resist is removed so as to expose a portion of the surface of the material forming a diffraction grating pattern, a portion of the diffraction grating pattern on the substrate is removed, the substrate is etched using the remaining resist pattern in direct contact with the portion of the substrate, as a mask and the other portion of the substrate is etched using the material pattern producing the diffraction grating as mask. Accordingly, there is no process of depositing an insulating film on a resist, the deterioration of the resist can be avoided, and a good quality $\lambda/4$ shift type diffraction grating can be produced, thereby producing a $\lambda/4$ shift type DFB laser which is not likely to deteriorate.

What is claimed is:

1. A method for producing a diffraction grating including a ¼ wavelength shift in the grating in a substrate comprising:

depositing an electrically insulating film directly on a surface of a substrate;

depositing a first masking film on the electrically insulating film and forming the first masking film into a first grating pattern;

etching the electrically insulating film using the first grating pattern as a mask and subsequently removing the first grating pattern of the first masking film to leave a grating pattern of the electrically insulating film on the surface of the substrate;

depositing a second masking film on the surface of the substrate and on the grating pattern of the electrically insulating film, thereby burying the grating pattern of the electrically insulating film;

etching the second masking film to expose at least a portion of the grating pattern of the electrically insulating film without entirely removing the second masking film;

depositing a third masking film on the second masking film and the exposed portion of the grating pattern of the electrically insulating film;

removing the third masking film and the grating pattern of the electrically insulating film from a portion of the substrate, thereby providing a grating pattern of the second masking film on the portion of the substrate where the third masking film and the electrically insulating film is removed, and etching the substrate using the grating pattern of the second masking film and the remaining portion of the third masking film as masks to thereby form a first portion of a diffraction grating in the substrate;

removing the second and third masking films from the substrate without removing the remaining portion of the grating pattern of the electrically insulating film;

depositing a fourth masking film on the surface of the substrate and the electrically insulating film and then removing the fourth masking film from a portion of the surface of the substrate excluding the first portion of the diffraction grating, to thereby expose the remaining portion of the grating pattern of the electrically insulating film and adjacent portions of the surface of the substrate;

etching the substrate using the grating pattern of the electrically insulating film and the fourth masking film as masks to thereby form a second portion of a diffraction grating in the substrate which second portion is shifted ¼ wavelength from the first portion diffraction grating in the substrate; and removing the remaining portions of the fourth masking film and the electrically insulating film to thereby form a ¼ wavelength shift diffraction grating.

2. The method of claim 1 wherein removing the fourth masking film from a portion of the substrate includes removing the fourth masking film so that the remaining portion of the fourth masking film contacts an electrically insulating film member of the remaining grating pattern of the electrically insulating film.

3. The method of claim 1 wherein the electrically insulating film is $SiN_x$ and where the depositing of the electrically insulating film is by ECR plasma CVD.

4. The method of claim 1 wherein the first masking film is a photoresist where the forming of the first masking film into a first grating pattern is by exposing the first masking film to interference fringes of light and developing the first film.

5. The method of claim 1 wherein the first, second, third, and fourth masking films are photoresists.

* * * * *